Patented Nov. 13, 1951

2,574,753

UNITED STATES PATENT OFFICE 2,574,753

COPOLYMERIZATION OF CONJUGATED DRYING OILS AND ACIDS WITH POLYMERIZABLE UNSATURATED COMPOUNDS

Carl J. Opp and Raymond E. Werner, Cincinnati, Ohio, assignors to Interchemical Corporation, New York, N. Y., a corporation of Ohio No Drawing. Application December 4, 1946, Serial No. 713,931

9 Claims. (Cl. 260—23)

This invention relates to improvements in the manufacture of polymerization products from conjugated unsaturated high molecular weight carboxylic acids or their esters and vinyl compounds such as ethylenically unsaturated hydrocarbons, and alpha, beta unsaturated lower fatty acids and their esters, amides and nitriles, especially where such polymerization products are formed by heat polymerization in the presence of peroxide catalysts in homogeneous phase.

It has been proposed to manufacture various resinous substances suitable for the preparation of protective coating compositions such as lacquers, varnishes, and the like, by effecting polymerization of vinyl compounds with unsaturated oils in the absence of water and preferably in the presence of a common neutral solvent for the ingredients. This process has its disadvantages. By this method, for instance, it has not been possible to incorporate into styrene more than about 25% of its weight of an unsaturated oil, such as linseed or China-wood oil, and obtain homogeneous stable products. Such polymerizations as these have in the past usually been carried out by heating the components to a suitable polymerizing temperature in a common solvent in the presence of a peroxide catalyst.

According to the present invention unsaturated fatty oil acids or their esters, such as dehydrated castor oil, China-Wood oil, and other similar unsaturated high molecular weight carboxylic acids and their esters such as rosin acids and their esters, are polymerized with one or more vinyl monomers such as ethylenically unsaturated hydrocarbons, alpha, beta unsaturated low molecular weight fatty acids, amides, nitriles and esters, and the like, to give homogeneous polymerization products which are useful for many purposes. Broadly, the process of the present invention involves heating, to a suitable polymerizing temperature, a mixture composed of the unsaturated high molecular weight carboxylic acids or their esters, the vinyl compound, a peroxide type catalyst, and a mercaptan, and stopping the reaction when the desired degree of polymerization is reached.

We have discovered that when such polymerizations are carried out in the presence of a mercaptan that a mixture of the unsaturated carboxylic acid or ester and vinyl compound in any desired proportion may be polymerized to give a homogeneous polymer. Such results, which are apparently due to the modifying action of the mercaptan, are a considerable improvement over prior art methods of polymerizing these substances. We are not aware of the exact nature of the polymeric product formed by our novel process but it appears that, due to the modifying action of the mercaptan, either the degree of polymerization or nature of the vinyl polymer formed permits it to be compatible with the unsaturated fatty oil or perhaps a true copolymer of the vinyl compound and unsaturated carboxylic acid or ester is formed. It is also possible that all of these effects contribute to the formation of our novel product. We, however, do not intend that the scope of our invention be limited by such theories.

For convenience is describing our invention we will refer to our novel product generally as a vinyl compound-unsaturated carboxylic acid copolymer and specifically, for instance, as a styrene-dehydrated castor oil copolymer. We have discovered that styrene and other equally reactive simple polymerizable unsaturated monomers such as cyclopentadiene, isoprene, acrylonitrile, and methyl methacrylate may be used in the process of our invention. These vinyl monomers fall within the general groups of vinyl aromatics, aliphatic diolefins, and alpha, beta unsaturated lower aliphatic acid, esters, nitriles, etc.

By the term conjugated unsaturated carboxylic acids and their esters as used herein we refer to rosin acids and their esters, China-wood oil fatty acids and esters, dehydrated castor oil fatty acids and esters, etc. The unsaturated acids and esters which we have found to be operable in the process of our invention come within the general group of conjugated unsaturated high molecular weight carboxylic acids and their esters. For example, China-wood oil is generally considered to consist largely of the glycerol esters of eleostearic acid, an 18 carbon fatty acid containing three conjugated double bonds. Dehydrated castor oil is believed to consist largely of the glycerol esters of 18 carbon fatty acids which contain a doubly conjugated system of unsaturated linkages. Oiticia oil resembles China-wood oil except that it also contains a keto group in the fatty acid chain. Conjugated unsaturated high molecular weight fatty acids result, as indicated by an increase in diene number, from the isomerization of the unsaturated fatty acids or esters with chemical agents such as iodine, hydrochloric acid, alumina, and acetic anhydride.

Rosin acids and their esters also fall within our general classification of conjugated unsaturated high molecular weight carboxylic acids and their esters. Wood rosin, for instance, consists largely of abietic acid, which is generally believed to be a complex cycloaliphatic monobasic carboxylic acid of 20 carbon atoms and containing two conjugated double bonds, or two non-conjugated double bonds which are readily isomerized to a conjugated system. It is obvious that the use of acids or esters which isomerize to conjugated unsaturated carboxylic acid under the conditions used for our process will fall within the scope of our invention. Although we have referred chiefly to conjugated unsaturated high molecular carboxylic acids as one of the reactants in our novel process, it will be obvious that in reactions of this type the esters of these unsaturated acids may be used in place of the acids.

Mercaptans have been used before now as modifiers of polymerizations in the synthetic rubber industry for the emulsion polymerization of diene with vinyl compounds. However, heretofore, it has not been known that advantageous results could be obtained by mass polymerizing unsaturated high molecular weight carboxylic acids or their esters with vinyl compounds in homogeneous phase and in the presence of mercaptans. Mercaptans which have been used extensively as modifiers of emulsion polymerization in the synthetic rubber industry are the alkyl, aralkyl and aryl mercaptans such as butyl, amyl, decyl, benzyl, phenyl and xylyl mercaptans. In our invention, however, we prefer to use an alkyl mercaptan or a mixture of alkyl mercaptans. We have found that such commercial products as Sulfole B-8, a mixture of isomeric dodecyl mercaptans, is quite satisfactory. Other alkyl mercaptans which are satisfactory include tertiary butyl, tertiary amyl, normal amyl, tertiary decyl, and tertiary hexadecyl mercaptans. Although the quantity of mercaptan inhibitors we can employ may vary over a broad range, we prefer to use from about 0.5 to 5% of the mercaptan based on the amount of vinyl compound employed in the polymerization mixture.

In general our polymerization process is preferably carried out by heating a mixture containing an unsaturated acid, or esters of such acids and one or more of the vinyl compounds, in the absence of water or organic solvent, but in the presence of a peroxide catalyst and mercaptan modifier. The unsaturated acid or ester and vinyl compound may be mixed in any desired proportion. In order to obtain resinous substances of greatest utility however, we prefer to mix the reactant in the ratio of about 10–90 parts of the unsaturated high molecular weight acid to 90–10 parts of the vinyl compound. The manner in which the reactants are mixed is not generally of great importance, e. g., they may be mixed cold and then heated to the desired temperature. On the other hand, one of the reactants may be heated first and then the other added to it. Also the peroxide catalyst and the mercaptan modifier may be added in any convenient manner.

The temperature to which the polymerization mixture is heated and the time for which it is heated will obviously vary from one polymerization to the other and will depend not only on the mixture being polymerized but also on the degree of polymerization desired. In general, however, we prefer to heat the mixture at substantially the reflux temperature of the mixture until refluxing ceases. This temperature will generally be of the order of 35° C. to 300° C., preferably 100° C. to 300° C. The heating may be conducted in an inert atmosphere, for instance, carbon dioxide or nitrogen. Such atmosphere is readily provided by bubbling the carbon dioxide or nitrogen gas through the reaction mixture. The set-up should include a device to draw off small amounts of water formed, during the reaction.

We can use any of the commercially available peroxide catalysts, such as, tertiary butyl hydroperoxide, lauryl peroxide, peracetic acid, tertiary butyl perbenzoate, benzoyl peroxide and the like.

Several different embodiments of the invention are illustrated in the following examples in which the parts are by weight. It should be understood, however, that these examples are intended to be illustrative only and are not intended to limit the scope of the invention.

Example I

Two-hundred fifty parts of styrene containing 1 percent Sulfole B-8, 750 parts of dehydrated castor oil and 5 parts of benzoyl peroxide were heated under reflux and with agitation at 150° C. for 6 hours. The original viscosity was less than 0.5 poises at 25° C. after heating for 6 hours at 150° C. the body had increased to about 5 poises. The product was clear, viscous homogeneous oil and tests indicated that 62 percent of styrene had polymerized.

Example II

Three-hundred thirty parts of styrene containing 1 percent Sulfole B-8, 670 parts of unbodied dehydrated castor oil and 5 parts of benzoyl peroxide were heated to 150° C., under reflux with agitation for 6.5 hours. The increase in body was from less 0.5 poises to about 21 poises and tests indicated that about 72.5 percent of the styrene had polymerized.

Example III

Four-hundred fifty parts of styrene, 1050 parts of dehydrated castor oil (Kastolene), about 12 parts of tertiary butyl mercaptan, and about 16 parts of tertiary butyl hydroperoxide were heated under reflux and with agitation until a liquid temperature of about 240° C. was reached and then held at that temperature until refluxing ceased. Heat was then removed, the condenser changed to distillation position and carbon dioxide was passed through the mixture until the liquid temperature dropped to 150° C. The yield of product having a viscosity of 63 poises and color 7 (Gardner Color scale) was 1515 parts.

Example IV

Six-hundred parts of styrene, 900 parts of dehydrated castor oil, about 12 parts tertiary butyl mercaptan and about 16 parts tertiary butyl hydroperoxide were cooked similarly to the procedure used in Example III. The product had a viscosity of 377 poises at 30° C.

Example V

Seven-hundred fifty parts of styrene, 750 parts of dehydrated castor oil, about 22 parts of tertiary butyl mercaptan and about 27 parts of tertiary butyl hydroperoxide were cooked similarly to the procedure in Example III. The viscosity of the product was too high to be run by ordinary methods.

Example VI

Twelve-hundred parts of styrene, 300 parts of dehydrated castor oil, about 60 parts of tertiary butyl mercaptan, and about 20 parts of tertiary butyl hydroperoxide were cooked similarly to the procedure in Example III. The yield of product, melting point 40° C. was 1505 parts.

Example VII

Thirteen-hundred fifty parts of styrene, 150 parts of dehydrated castor oil, about 100 parts of tertiary butyl mercaptan, and about 24 parts of tertiary butyl hydroperoxide were cooked similarly to the procedure in Example III. The yield of product, melting point 45° C., was 1580 parts.

Example VIII

Two-hundred parts of styrene, 100 parts of China-wood oil, about 2.5 parts tertiary butyl mercaptan, and about 2 parts of tertiary butyl hydroperoxide were heated at reflux with agitation until the hot viscosity (25° C.) was 8.9 poises and the mixture contained 63 percent non-volatile constituents.

Example IX

Four-hundred fifty parts of styrene, 1050 parts of alkali refined linseed oil, about 12 parts of tertiary butyl mercaptan, and about 16 parts of tertiary butyl hydroperoxide were cooked according to the procedure in Example III. The yield of product having a viscosity of 2.5 poises and color of 6 (Gardner Color scale) was 1460 parts.

Example X

To 735 parts of linseed fatty acids was added 495 parts of styrene, about 10 parts of t-butyl mercaptan, and about 15 parts of t-butyl hydroperoxide. The mixture was heated up to 300° F. in a flask equipped with stirrer, reflux condenser, and Dean and Stark tube. The temperature was gradually increased to 500° F. in about 2½ hours and held at this temperature for about 10 minutes or until the batch stopped refluxing. The yield of clear product having acid number 112 and viscosity of about 7.5 poises was 1220 grams.

Example XI

To 735 parts of dehydrated castor oil fatty acids was added 495 parts of styrene, about 10 parts of t-butyl mercaptan and about 15 parts of t-butyl hydroperoxide. The mixture was heated up to 300° F. with stirring in a flask equipped with reflux condenser and Dean and Stark tube and then the temperature was gradually raised over the course of about 2½ hours to 500° F. The temperature was held at 500° F. until the mixture stopped refluxing. The yield of clear product having acid number 124 and viscosity of about 25 poises was 1220 grams.

Example XII

To 900 parts of dehydrated castor oil heated to 350° F. was added 40 parts of methyl methacrylate, about 12 parts of t-butyl mercaptan and about 15 parts of t-butyl hydroperoxide, by means of a dropping funnel which extended below the liquid surface. While the mixture was continuously stirred under reflux the temperature was gradually raised to 500° F. The total cooking time was 10 hours. The yield of clear product having a viscosity of 63.4 poises was 1350 grams.

Example XIII

To 1200 parts dehydrated castor oil was added 300 parts of methyl methacrylate, about 25 parts of t-butyl mercaptan, and about 25 parts of t-butyl hydroperoxide and the mixture heated with stirring to 300° F. Thereafter the mixture was heated gradually up to a temperature of about 500° F. until refluxing ceased. Total cooking time was about 7 hours. The product was clear, indicating that the oil and methyl methacrylate had copolymerized.

Example XIV

To 750 parts of alkali isomerized dehydrated castor oil fatty acids was added 250 parts of acrylonitrile, about 8 parts of t-butyl mercaptan and about 12 parts t-butyl hydroperoxide. The mixture was then refluxed at 180°–190° F. for about 2 hours and gave a clear homogeneous product having a viscosity of about 1.35 poises.

Example XV

A mixture consisting of 480 parts China-wood oil, 320 parts cyclopentadiene, about 5 parts t-butyl mercaptan and about 8 parts of t-butyl hydroperoxide was heated to reflux (about 130° F.) in the usual manner, then the temperature was gradually raised to 330° F. in 2 hours. The temperature was then held at 330°–335° F. for 5 hours to give 800 parts of a clear, homogeneous product having a viscosity of 1.65 poises. Tests indicated that about 25% of the cyclopentadiene had reacted.

Example XVI

To 350 parts of dehydrated castor oil was added 238 parts of isoprene, about 5 parts of t-butyl mercaptan and t-butyl hydroperoxide. This mixture was heated in the usual manner until refluxing began at about 105° F. Heating and refluxing was continued over a period of about 3 hours, or until the temperature had reached 500° F. The yield of product at the end of the cook was 375 grams indicating that a large portion of the isoprene had been lost. The product was clear and homogeneous indicating that there had been some reaction. It is anticipated that if the heating had been more gradual there would have been a greater yield of copolymer.

Example XVII

A mixture of 500 parts W. W. Gum rosin and 500 parts of styrene was polymerized by heating under reflux and stirring. The initial reflux temperature was 300° F. and gradually increased to 450° F. during 6 hours of heating. The viscosity gradually increased passing through the stage of a viscous liquid to a hard brittle solid at room temperature. The yield of solid brittle product having acid number 79 was substantially 100%. This example was taken from the prior art for purposes of comparison with the product prepared by the procedure of our invention as shown in Example XVIII.

Example XVIII

The procedure was similar to Example XVII except that the polymerization was modified by adding about 5% by weight of amyl mercaptan and about 4% by weight of t-butyl hydroperoxide (both based on the weight of styrene). The product formed by this modified procedure was different from the product obtained in Example XVII in that it was compatible with linseed oil at room temperature while the product obtained by the previous example was not soluble. Furthermore the product formed by the mercaptan modified procedure may be converted to its glycerol ester and then cooked into a varnish.

The advantages obtained by the process of our invention will be apparent to those skilled in the art of preparing resins from unsaturated fatty oil acids or their esters and vinyl compounds. Experience has shown that it is difficult to polymerize high molecular weight unsaturated fatty acids or their esters with vinyl compounds and obtain a homogeneous polymeric product. For instance, when styrene is heat polymerized with dehydrated castor oil in the presence of a peroxide catalyst, but in the absence of the mercaptan modifiers of our invention, an incompatibility develops which is principally due to formation of high molecular weight polystyrene. However, in the presence of mercaptan modifier, the product is homogeneous and appears to be a true copolymer of styrene and the dehydrated castor oil. We know of no prior art procedure which gives a product like that obtained by our novel process.

The polymeric substances produced by our novel process are useful in the manufacture of various types of industrial finishes such as enamels, lacquers and varnishes. They are especially useful as intermediates in the preparation of modified alkyd resins for use in alkali resistant finishes.

Since many widely different embodiments of this invention may be made without departing from the scope thereof, it is intended that we do not limit ourselves to the specific embodiments appearing herein except as defined by the appended claims.

We claim:

1. The method of copolymerizing a mixture consisting of 1) 10 to 90 parts of a conjugated ethylenically unsaturated compound of the class consisting of drying oils, drying oil acids, and rosin and 2) 90 to 10 parts of a polymerizable unsaturated compound of the class consisting of styrene, acrylonitrile, methyl methacrylate, isoprene, and cyclopentadiene, which consists in heating the mixture of 1) and 2) at a temperature of 35° to 300° C. in the presence of a peroxide catalyst and from 0.5 to 5%, based on polymerizable unsaturated compound, of an alkyl mercaptan having at least four carbon atoms, and in the absence of water and organic solvents.

2. The method of copolymerizing a mixture consisting of 1) 10 to 90 parts of a conjugated ethylenically unsaturated compound of the class consisting of drying oils, drying oil acids, and rosin and 90 to 10 parts of a polymerizable unsaturated compound of the class consisting of styrene, acrylonitrile, methyl methacrylate, isoprene and cyclopentadiene, which consists in heating the mixture of 1) and 2) at a temperature of 35° to 300° C. in the presence of a peroxide catalyst and from 0.5 to 5%, based on the polymerizable unsaturated compound, of tertiary butyl mercaptan, and in the absence of water and organic solvents.

3. The method of copolymerizing a mixture consisting of 1) 10 to 90 parts of a conjugated ethylenically unsaturated compound of the class consisting of drying oils, drying oil acids, and rosin and 2) 90 to 10 parts of methyl methacrylate, which consists in heating the mixture of 1) and 2) at a temperature of 35° to 300° C. in the presence of a peroxide catalyst and from 0.5 to 5%, based on methyl methacrylate, of an alkyl mercaptan having at least four carbon atoms, and in the absence of water and organic solvents.

4. The method of copolymerizing a mixture consisting of 1) 10 to 90 parts of a conjugated ethylenically unsaturated compound of the class consisting of drying oils, drying oil acids, and rosin and 2) 90 to 10 parts styrene, which consists in heating the mixture of 1) and 2) at a temperature of 35° to 300° C. in the presence of a peroxide catalyst and from 0.5 to 5%, based on styrene, of an alkyl mercaptan having at least four carbon atoms, and in the absence of water and organic solvents.

5. The method of copolymerizing a mixture consisting of 10 to 90 parts of dehydrated castor oil and 90 to 10 parts of styrene which consists in heating the said mixture at 100° to 300° C. in the presence of a peroxide catalyst and 0.5 to 5%, based on styrene of an alkyl mercaptan containing at least four carbon atoms, and in the absence of water and organic solvents.

6. The method of copolymerizing a mixture consisting of 10 to 90 parts rosin and 90 to 10 parts of styrene which consists in heating the said mixture at 35° to 300° C. in the presence of a peroxide catalyst and from 0.5 to 5%, based on styrene, of an alkyl mercaptan having at least four carbon atoms, and in the absence of water and organic solvents.

7. A resinous product characterized by being capable of reaction with polyhydric alcohol and polybasic carboxylic acid to form a homogeneous alkyd resin, produced by heating to 35° to 300° C. a mixture consisting of 1) 10 to 90 parts of a conjugated ethylenically unsaturated compound of the class consisting of drying oils, drying oil acids, and rosin and 2) 90 to 10 parts of a polymerizable unsaturated compound of the class consisting of styrene, acrylonitrile, methyl methacrylate, isoprene and cyclopentadiene, the said heating being carried out in the presence of a peroxide catalyst and 0.5 to 5% based on the polymerizable unsaturated compound, of an alkyl mercaptan having at least four carbon atoms, and in the absence of water and organic solvents.

8. A resinous product, characterized by being capable of reaction with polyhydric alcohol and polybasic carboxylic acid to form a homogeneous alkyd resin, produced by heating to 35° to 300° C. a mixture consisting of 10 to 90 parts of rosin and 90 to 10 parts of styrene, the said heating being carried out in the presence of a peroxide catalyst and 0.5 to 5%, based on styrene, of an alkyl mercaptan having at least four carbon atoms, and in the absence of water and organic solvent.

9. A resinous product, characterized by being capable of reaction with polyhydric alcohol and polybasic carboxylic acid to form a homogeneous alkyd resin, produced by heating to 35° to 300° C. a mixture consisting of 10 to 90 parts of dehydrated castor oil and 90 to 10 parts of styrene, the said heating being carried out in the presence of a peroxide catalyst and 0.5 to 5% based on styrene, of an alkyl mercaptan having at least four carbon atoms, and in the absence of water and organic solvents.

CARL J. OPP.
RAYMOND E. WERNER.

REFERENCES CITED

The following references are of record in the file of this patent:

UNITED STATES PATENTS

| Number | Name | Date |
|---|---|---|
| 2,281,613 | Wollthan et al. | May 5, 1942 |
| 2,341,175 | Britton et al. | Feb. 8, 1944 |
| 2,395,504 | Rubens et al. | Feb. 26, 1946 |
| 2,396,997 | Fryling | Mar. 19, 1946 |
| 2,397,201 | Pfau | Mar. 26, 1946 |
| 2,460,038 | Serniuk | Jan. 25, 1949 |
| 2,470,417 | Vanderbilt et al. | May 17, 1949 |
| 2,476,341 | Weber | July 19, 1949 |
| 2,488,149 | Vanderbilt et al. | Nov. 15, 1949 |